United States Patent
Boonpongmanee

(10) Patent No.: US 8,967,356 B2
(45) Date of Patent: Mar. 3, 2015

(54) EXPANDER BRAKE/CLUTCH ASSEMBLY AND METHOD OF MAKING SAME

(71) Applicant: Thaveesak Boonpongmanee, Westlake, OH (US)

(72) Inventor: Thaveesak Boonpongmanee, Westlake, OH (US)

(73) Assignee: Eaton Corporation, Cleveland, OH (US)

(*) Notice: Subject to any disclaimer, the term of this patent is extended or adjusted under 35 U.S.C. 154(b) by 222 days.

(21) Appl. No.: 13/763,773

(22) Filed: Feb. 11, 2013

(65) Prior Publication Data

US 2014/0224612 A1 Aug. 14, 2014

(51) Int. Cl.
*F16D 25/04* (2006.01)
*F16D 13/10* (2006.01)

(52) U.S. Cl.
CPC .............. *F16D 25/046* (2013.01); *F16D 13/10* (2013.01)
USPC ....................................................... 192/85.13

(58) Field of Classification Search
CPC ............................... F16D 25/046; F16D 13/10
USPC ........ 192/85.03, 85.04, 85.12, 85.13, 113.21; 188/78, 79, 340
See application file for complete search history.

(56) References Cited

U.S. PATENT DOCUMENTS

| 2,637,345 | A | * | 5/1953 | Kraft | 192/85.13 |
| 2,870,891 | A | * | 1/1959 | Eakin et al. | 192/85.13 |
| 8,292,044 | B2 | * | 10/2012 | Simons et al. | 192/85.02 |

* cited by examiner

*Primary Examiner* — Jacob S Scott
(74) *Attorney, Agent, or Firm* — Fay Sharpe LLP

(57) ABSTRACT

A pneumatic expander brake/clutch having a first power transmission member as a drum with an annular friction surface on the outer periphery. Arcuate backing block segments are circumferentially closely spaced and adjacent about the drum friction surface. The backing blocks have brake friction pads on the radially inner surface. An inflatable expander ring surrounds the backing blocks and upon inflation forces the blocks radially inward and the pads against the drum friction surface. Baffles are provided on the end of the backing blocks and extend into the spaces between circumferentially adjacent blocks to form a tortuous path for heat emanating from the drum friction surface in a radially outer direction. The baffles insulate the inflatable expander from heat which permits the drum friction surface to operate at a higher temperature, and power transmission/dissipation without overheating the expander.

18 Claims, 4 Drawing Sheets

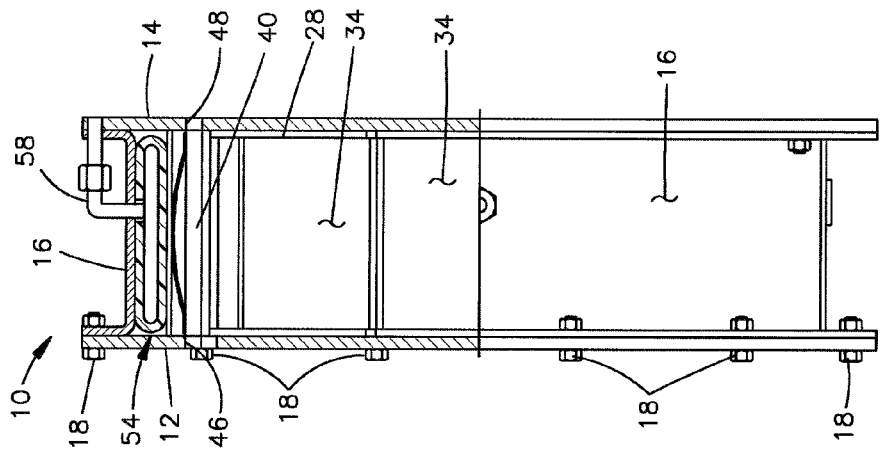
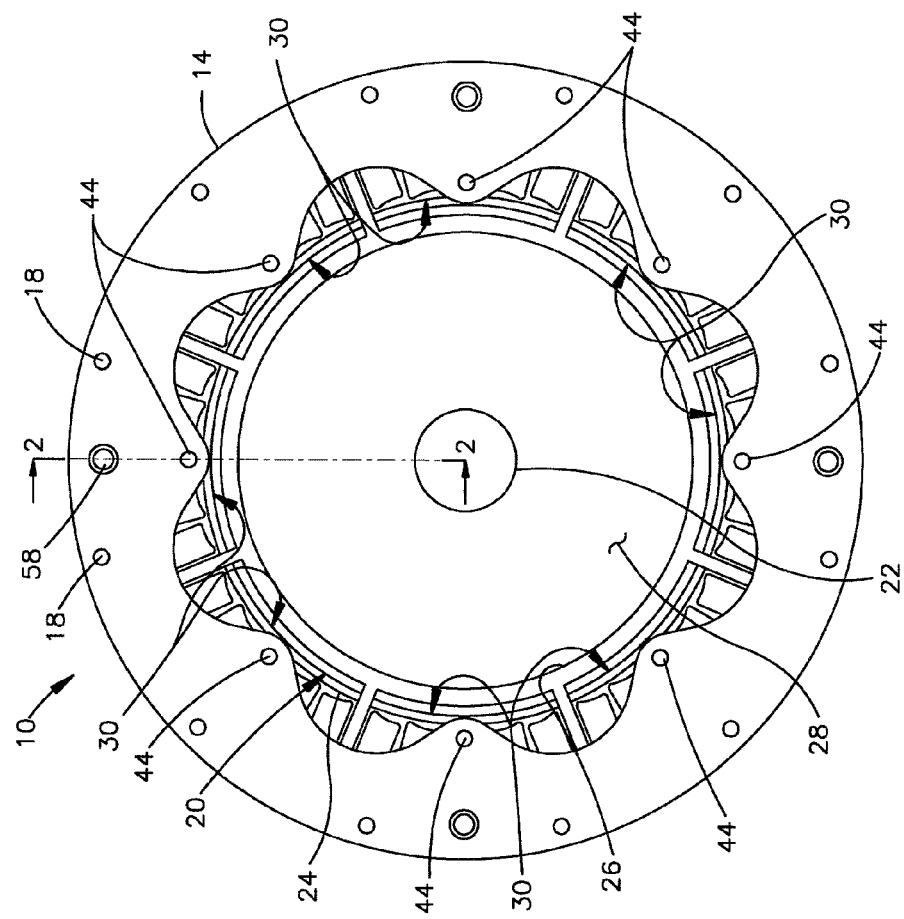

EXPANDER BRAKE/CLUTCH ASSEMBLY AND METHOD OF MAKING SAME

BACKGROUND

The present disclosure relates to pneumatic expander brake/clutch devices employed for braking or clutching power transmission on rotating elements and machinery such as cable drums and marine propeller shafts, where it is desired to brake or engage power transmission between shafts or between a shaft or drum and a stationary element. Such devices are often employed to transmit or dissipate substantial amounts of shaft power, for example, brakes or clutches capable of handling torque of 300,000 newton meters (N.m) and having diameters up to 77 inches (193 cm) for applications such as, for example, grinding mills, marine propulsion, metal forming machinery and oil field machinery. Such relatively large pneumatic brakes/clutches may employ a drum having a peripheral frictionally engaging surface against which are forced friction pads on an array of arcuately configured circumferentially disposed backing blocks which force the friction material or friction pads thereon against the drum friction surface under the action of an inflatable annular ring or expander surrounding the array of arcuate backing blocks.

In service, such relatively large brakes/clutches generate heat upon the drum friction surface during braking/clutching; and, the heat radiates outwardly in the space between the arcuate backing blocks disposed about the drum. Heretofore, in service with such large brakes/clutches, it has been found that when the temperature on the friction surface of the drum reaches about 600° F. (315° C.) the temperature of the inflatable surrounding the arcuate blocks can exceed the 250° F. (121° C.) service limiting temperature for the materials, typically rubber, employed in the inflatable ring. This temperature limitation of the inflatable ring thus limits the permissible temperature rise on the friction surface of the drum and, thus, the amount of power transmitted or dissipated by the brake/clutch assembly.

Thus, it has been desired to provide a way or means of increasing the allowable surface temperature of the friction surface on the drum of a pneumatically operated brake/clutch assembly in order to increase the amount of power or torque transmitted or dissipated by the brake/clutch assembly for a given size drum friction surface without overheating the expander ring.

SUMMARY

The present disclosure describes and illustrates a pneumatic expander brake/clutch of the type employing an annular friction surface on one rotating power transmission member and an annular array of arcuate blocks circumferentially disposed about the annular friction surface and having friction material or braking pads thereon which are forced against the annular friction surface on the first power transmission member by pneumatic inflation of an annular inflatable ring or expander disposed circumferentially about and adjacent the arcuate backing blocks. The spaces between adjacent arcuate backing blocks are provided with baffles extending therein in circumferentially overlapping or interdigitated arrangement. The baffles prevent the radiant heat emanating from the friction surface on the first power transmission member from emanating radially outwardly and irradiating or heating the inflatable rubber expander ring above its normal limiting service temperature. These baffles enable the operating temperature of the annular friction surface on the first power transmission member to be dramatically increased for an existing brake/clutch arrangement and, thus, substantially increase the power transmission/dissipating capacity of an existing brake/clutch assembly without increasing the size of the annular friction surface and dimensions of the first power transmission member.

In one version, the baffles are formed integrally extending from the ends of the brake pad backing blocks; and, in another version, the baffles are separate members attached to the existing brake pad backing blocks by fasteners.

BRIEF DESCRIPTION OF THE DRAWINGS

FIG. 1 is a front elevation view of a pneumatic expender brake assembly of the type having an annular friction surface disposed about the periphery of a rotating drum;

FIG. 2 is a left side elevation view, in partial section, of the version of FIG. 1;

DETAILED DESCRIPTION

Figure 3:
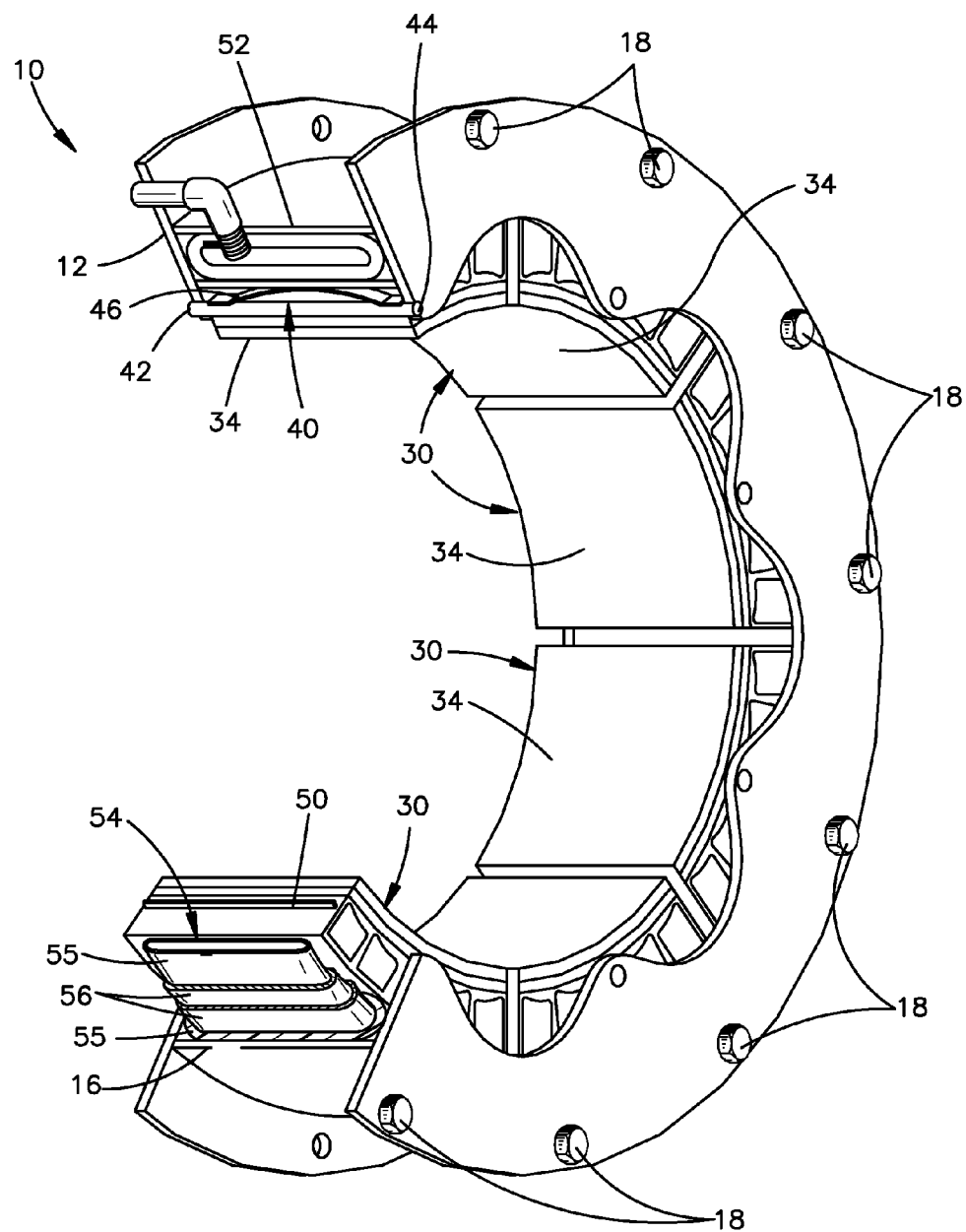
FIG. 3 is a perspective view of the version of FIG. 1 with portions thereof broken away to show the internal components.

Referring to FIGS. 1-4, one version of a pneumatically operated expander brake is indicated generally at 10 and includes a first power transmission element in the form of a stator comprising spaced annular plates 12, 14 secured to a spacer in the form of a peripherally flanged annular channel member 16 by suitable fasteners, such as bolts 18, wherein the axial width of the channel 16 provides the desired spacing of the stator plates 12, 14. A braking drum, indicated generally at 20, is disposed between the plates 12, 14 and concentrically therewith on a second power transmission member in the form of shaft 22 with the drum having an outer annular friction surface 24 which comprises the outer periphery of a rim flange 26 supported by web 28 attached to the shaft 22 for rotation therewith with respect to stator plates 12, 14.

A plurality of arcuate elements indicated generally at 30, 30' are disposed in circumferentially spaced annular array about the friction surface 24 and are disposed on a first power transmission member by connection to the stator plates 12, 14 as will hereinafter be described.

Figure 4:
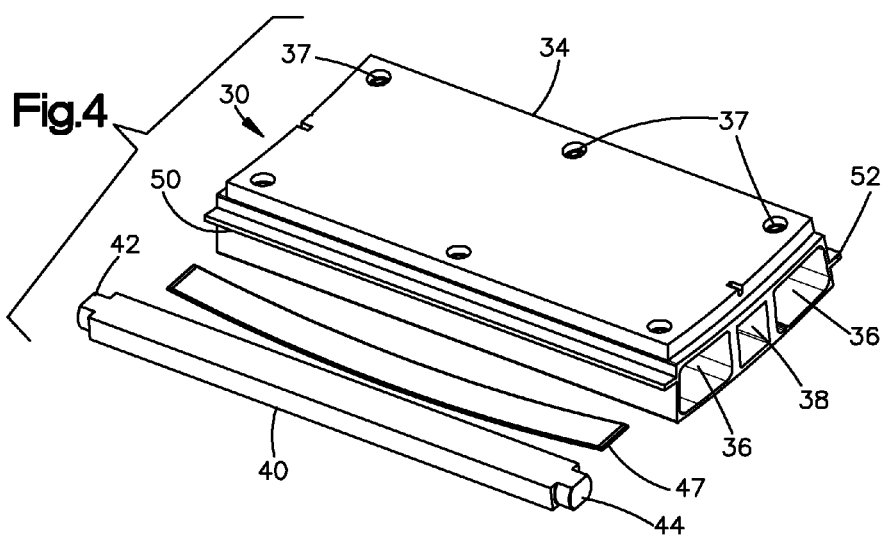
FIG. 4 is a perspective view of the brake block, friction pad, torque bar and pad return spring components of the version shown in FIG. 3.

Referring to FIGS. 3 and 4, each of the arcuate elements 30 includes an arcuate brake backing block 32 which has attached thereto friction material in the form of a friction pad 34 of suitable material for frictionally contacting the annular friction surface 24. In the present practice, the friction pads 34 are attached to the brake block 32 by suitable fasteners 37 such as, for example, rivets.

The brake backing block 32 is illustrated in FIG. 4 as having a plurality of three circumferentially spaced voids or channels extending axially therethrough, with the center void disposed at the mid-point of the arcuate block 32 and denoted by reference numeral 38; and, the outer voids denoted by reference numeral 36.

Figure 5:
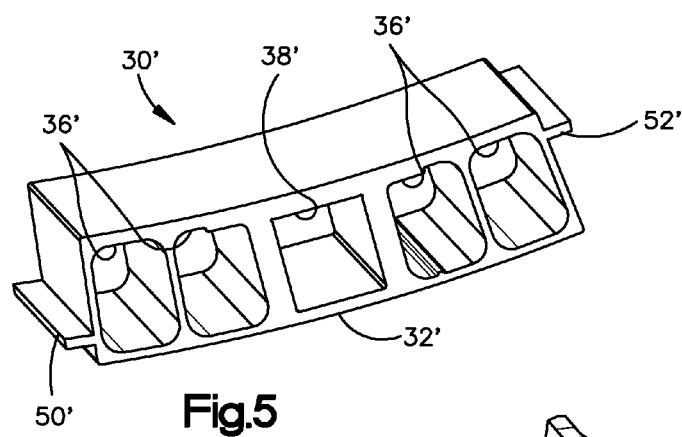
FIG. 5 is a perspective view of another version of the arcuate brake backing blocks employing an integrally formed baffle on each end thereof for use in the arrangement of FIG. 3.

Referring to FIG. 5, another version of the brake backing block has been denoted by the reference numeral 32' as having five axial voids including a central void 38' and four outer voids 36'. Whereas, the arcuate block 32 shown in FIG. 4 has a central axial passage or void 38 with one axial passage 36 on each opposite circumferential side as denoted by reference numeral 36. Either of the arcuate brake backing blocks 32, 32' may be disposed between annular stator plates 32, 36 and the selected block is secured therein by a torque bar 40 which has lugs or pins 42, 44 formed on opposite ends thereof which lugs 42, 44 engage apertures 46, 48 provided respectively on the stator plates 12, 14. The width of the torque bars 40 is selected to closely interfit the sides of the brake backing block center void 38, 38' in a manner permitting sliding movement of the brake block 32, 32' in a radial direction with respect to the annular friction surface 24. It will be understood, however, that the torque bar 40 is sized in width to prevent any movement of the associated brake backing block 32, 32' in a circumferential direction. A return spring in the form of leaf spring 47 is provided for either of the brake blocks 32, 32' for urging the block in a radially outward direction. The spring 47 is shown in a form which has been found satisfactory in the present practice as comprising an arcuate leaf spring, the ends thereof which register against the torque bar 40 and the central region of the arcuate spring registers against the surface of the respective center void 38, 38'.

Either version of the arcuate brake blocks 32, 32' has provided on the opposite circumferential ends thereof at least one baffle member denoted respectively 50, 52 and 50', 52' which extend, in a circumferential direction, an amount substantially equal to the width in the circumferential direction of the spaces formed between the arcuate elements 30. In the present practice, it has been found satisfactory to stagger, in a radial direction, the location of the baffle elements 50, 52 and 50', 52' on the brake backing blocks 30, 30' such that the baffle members extending from circumferentially adjacent arcuate backing blocks 32, 32' respectively extend into the space between the arcuate elements 30 at different radial locations. This arrangement provides a tortuous path for any radiant energy, such as heat energy, emanating from annular the friction surface 24 of the first power transmission member or drum which heat energy is substantially blocked from direct flow radially outwardly and is substantially blocked from contact with the annular inflatable or expander, indicated generally at 54, disposed about the arcuate elements 30.

In the present practice, the inflatable annular element or expander 54 may be formed of rubber material in layers 55 and reinforced therebetween with layers of corded material indicated by reference numeral 56 in FIG. 3. The inflatable 54 has a pneumatic inlet fitting 58 which is connected through stator plate 14 and adapted for external connection thereto for supplying air pressure to the inflatable 54 when it is desired to force the brake blocks with pads 34 into contact with the annular friction surface 24 on the first power transmission member for effecting braking thereof.

Referring to FIGS. 4 and 5, in the present practice, the brake backing block members 32, 32' are formed integrally as one piece with their respective baffle members 50, 52 and 50', 52'. In the present practice, it has been found satisfactory to form the one piece arcuate block members 32, 32' of aluminum material and, in particular, 6061 aluminum alloy has been found satisfactory; however, it will be understood that other suitable materials may be employed as, for example, alloys of nickel and steel. In the present practice, aluminum has been chose for ease of fabrication, reduced weight and reduced cost.

It will be understood that although only one baffle member has been shown in the versions 32, 32' of the arcuate brake block, a plurality of baffle members 50, 52 and 50', 52' may be employed provided they are spaced for interdigitated arrangement.

Figure 6:
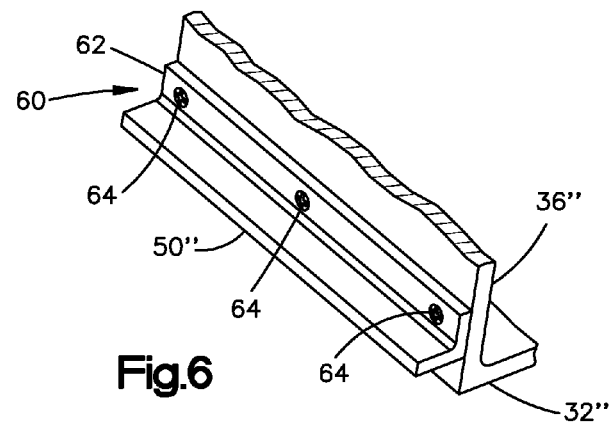
FIG. 6 is a partial perspective view of an alternate version of the arcuate brake backing block of FIG. 5 having the baffles attached thereto with fasteners; and, FIG. 7 is a cross-sectional view of a version of the present disclosure employed as a pneumatic expander clutch assembly.

Referring to FIG. 6, an alternate version of the baffle member is indicated generally at 60 and has right angle configuration in transverse section with a flange 62 provided therealong for attachment by suitable fasteners, such as screws 64, to an end of the arcuate brake block 32", a portion of which is shown in FIG. 6 with void 36" therethrough.

Figure 7:
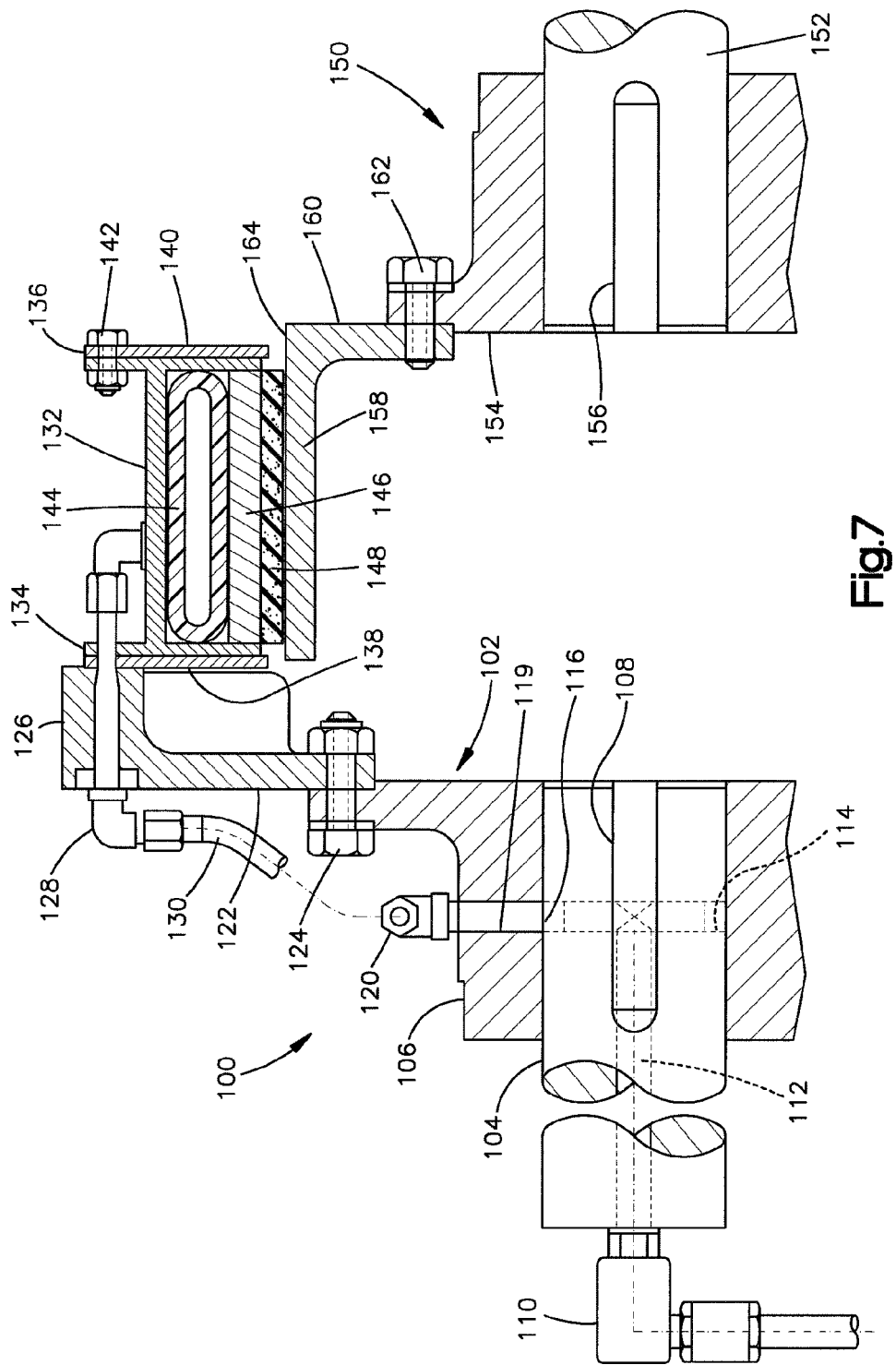

Referring to FIG. 7, a version of the present pneumatic expander brake/clutch is illustrated as a rotating clutch indicated generally at 100 which has a first power transmission element indicated generally at 102 which includes an input shaft 104 rotatably driving a hub 106, via a keyway 108. Shaft 104 has an air supply fitting 110 rotatably connected to the end thereof for supplying air through central passage 112, indicated in dashed line in FIG. 7, to a plurality of radial ports 114, 116 formed in shaft 104 and shown in dashed line which supply air through passage 119 in hub 106 to a fitting 120 provided on the hub 106. An outer annular drive ring 122 is connected to the hub 106 by bolts 124 spaced thereabout circumferentially. The ring 122 has an outer annular flange 126 through which is received a fluid fitting 128 which is connected via a tube 130 to the fitting 120. An annular channel member 132 has a pair of annular axially spaced flanges 134, 136 which are connected to annular rings 138, 140 by suitable fasteners such as bolts 142.

An annular inflatable 144 is disposed on the inner periphery of the channel 132 and has disposed about the inner periphery thereof a plurality of arcuate annular backing elements 146 in circumferentially spaced arrangement, each of which has attached thereto a friction pad 148.

A second power transmission element indicated generally at 150 has a shaft 152 drivingly connected to a hub 154 by means of a keyway 156. The hub 154 has attached thereto an annular flange 160 secured to the hub by a plurality of circumferentially spaced bolts 162. Flange 160 is connected to an annular drum 158. The outer periphery of the drum 158 has an annular friction surface 164 formed thereon which is engaged in frictional contact, upon inflation of the inflatable 144, by the friction pads 148 for clutching and connecting the shaft 152 for effecting rotation of the shaft 104. It will be understood that the arcuate block members 146 are secured by torque bars in the manner as the version 10; and, in each of the arcuate braking elements 146 has a baffle member extending from the circumferential ends thereof in a manner similar to the baffles 50, 52.

The present disclosure thus describes pneumatic expander brake/clutch which has the arcuate backing elements or brake blocks with friction material or brake pads thereon disposed on a first power transmission element and circumferentially spaced arrangement and surrounded by an annular inflatable adapted for connection to a source of pressurized fluid. Upon inflation of the inflatable, the arcuate elements are urged radially inwardly causing the brake pads to frictionally engage the annular friction surface of a second power transmission element. Each of the brake blocks has a baffle member extending from opposite circumferential ends thereof into the spaces between adjacent arcuate elements. The baffles thus create a tortuous path and prevent direct contact of radiant energy emanating radially outwardly from the annular friction surface of the second power transmission element with the surface of the inflatable to prevent heating thereof. The baffles thus enable the annular friction surface of the second power transmission element to experience a substantially greater temperature in service during frictional engagement without increasing the temperature of the annular inflatable. Thus, by substituting the arcuate backing elements in an existing brake/clutch design without changing the dimensions thereof, a substantially greater amount of torque may be transmitted or absorbed by the brake/clutch assembly of the present disclosure.

In the present practice, it has been found that when the surface temperature of the annular friction surface on one of the power transmission elements of an existing brake/clutch reaches 600° F. (315° C.), that the temperature of the inflatable exceeds 250° F. (131° C.) and overheating and thus damage to the inflatable occurs. However, when the baffle members are employed on the arcuate backing elements of an existing brake/clutch in accordance with the present disclosure, the temperature of the annular friction surface may be permitted to reach 1200° F. (648° C.) without the temperature of the inflatable exceeding 250° F. (131° C.). This has resulted in a pneumatic expander brake/clutch assembly having a given size power transmission elements, upon insertion of arcuate elements with the disclosed baffle members, being capable of generating/absorbing 40% more power and torque.

Obviously, modifications and alterations will occur to others upon reading and understanding the preceding detailed description. It is intended that the exemplary versions described herein be construed as including all such modifications and alterations insofar as they come within the scope of the appended claims or the equivalents thereof.

The invention claimed is:

1. A pneumatic expander brake/clutch assembly comprising:
   (a) a first power transmission element;
   (b) a second power transmission element disposed for rotation with respect to the first element and including an annular friction surface;
   (c) an annular array of a plurality of arcuate elements disposed on the first power transmission element in circumferentially spaced arrangement about the annular friction surface and movable radially with respect to the annular friction surface wherein, each arcuate element includes a friction pad and a plurality of voids extending axially therethrough;
   (d) an annular inflatable disposed on the first power transmission element about the arcuate elements and operable upon inflation to move the arcuate elements radially for effecting relative rotating contact of the friction pads with the annular friction surface of the second power transmission element for effecting power transmission between the first power transmission element and the second power transmission element;
   (e) a torque bar connected to the first power transmission element and extending through one of the plurality of voids in each of the arcuate elements and operative for permitting movement of the respective arcuate element only in the radial direction; and,
   (f) a baffle member extending in a circumferential direction from opposite ends of each arcuate element into the space between adjacent arcuate elements, wherein the baffle members of adjacent arcuate elements are staggered radially at different radial locations and interdigitated thereby defining in the space therebetween a tortuous path for radiant energy emanating from the annular friction surface to the inflatable.

2. The assembly defined in claim 1, wherein each of the members is formed integrally as one piece with the respective arcuate element.

3. The assembly defined in claim 2, wherein the arcuate elements are formed of aluminum.

4. The assembly defined in claim 2, wherein the arcuate elements are formed of 6061 aluminum.

5. The assembly defined in claim 1, wherein the arcuate elements are formed of aluminum and the baffle member is formed of galvanized steel.

6. The assembly of claim 1, wherein each arcuate element includes a plurality of baffle members and the baffle members extending into the space between adjacent arcuate elements are interdigitated.

7. The assembly of claim 1, wherein the first power transmission member includes a pair of axially spaced plate members with opposite ends of each torque bar connected respectively to a different one of the pair.

8. The assembly of claim 1, wherein the friction pads are secured to the respective arcuate elements by fasteners.

9. The assembly of claim 1, wherein the second power transmission element includes a drum having the annular friction surface disposed about a periphery thereof.

10. A method of making an expander brake/clutch comprising:
    (a) providing a first power transmission element;
    (b) providing a second power transmission element having an annular friction surface thereon and disposing the second power transmission element for rotation with respect to the first power transmission element;
    (c) disposing an annular array of arcuate elements each having a plurality of spaced axial voids therethrough in circumferentially spaced arrangement about the annular friction surface and disposing a friction pad on each arcuate element;
    (d) disposing an annular inflatable about the array of annular elements and securing the inflatable to the first power transmission element;
    (e) disposing a torque bar through one of the voids in each arcuate element and connecting opposite ends of the bar to the first power transmission element and permitting only radial movement of the arcuate elements with respect to the annular friction surface; and,
    (f) providing at least one baffle member on each end of each arcuate element and extending the baffle member into the space between adjacent arcuate elements in the array and forming a tortuous path for radiant energy emanating in the space from the friction surface to the inflatable.

11. The method of claim 10, wherein providing at least one baffle member comprises forming the at least one baffle member integrally as one piece with the respective arcuate element.

12. The method of claim 10, wherein providing at least one baffle member includes attaching the baffle member to the arcuate element with fasteners.

13. The method of claim 10, wherein disposing a torque bar includes providing the first power transmission element with a pair of axially spaced plate members and connecting opposite ends of the torque bar respectively to a different one of the pair.

14. The method of claim 10, wherein disposing a friction pad includes attaching the pad to the arcuate element with fasteners.

15. The method of claim 10, wherein disposing an annular array of arcuate elements includes forming the arcuate elements of aluminum.

16. The method of claim 12, wherein forming the arcuate elements includes forming the arcuate elements of 6061 aluminum alloy.

17. The method of claim 10, wherein providing at least one baffle member includes forming the arcuate elements of aluminum and forming the at least one baffle member of a galvanized steel.

18. The method of claim 10, wherein providing a second power transmission element having an annular friction surface includes providing a drum having the annular friction surface formed on a periphery thereof.

\* \* \* \* \*